United States Patent [19]

Davis

[11] Patent Number: 4,977,735

[45] Date of Patent: Dec. 18, 1990

[54] LAWN SCULPTURING METHOD AND APPARATUS

[76] Inventor: John W. Davis, 13223 Brackley Rd., Silver Spring, Md. 20904

[21] Appl. No.: 446,782

[22] Filed: Dec. 6, 1989

[51] Int. Cl.⁵ .................................................. A01D 34/73
[52] U.S. Cl. .................................................... 56/295
[58] Field of Search ............ 56/295, 289, 229, DIG. 9

[56] References Cited

U.S. PATENT DOCUMENTS

| | | | |
|---|---|---|---|
| 2,576,884 | 11/1951 | Leigh | 56/295 |
| 2,908,128 | 10/1959 | Mauro | 56/295 |
| 3,243,944 | 4/1966 | Michaud | 56/295 |
| 3,780,509 | 12/1973 | Woelffer | 56/295 |
| 4,254,607 | 3/1981 | Moore | 56/295 |
| 4,257,214 | 3/1981 | Ferguson et al. | 56/295 X |
| 4,426,831 | 1/1984 | Klas et al. | 56/295 |
| 4,628,672 | 12/1986 | Jones | 56/295 |
| 4,712,364 | 12/1987 | Oxley | 56/295 |
| 4,715,173 | 12/1987 | Anderson | 56/295 |
| 4,750,320 | 6/1988 | Liebl | 56/295 |
| 4,765,127 | 8/1988 | Hamblen | 56/295 |
| 4,774,803 | 10/1988 | Kempton | 56/295 |
| 4,922,698 | 5/1990 | Taylor | 56/295 |

*Primary Examiner*—Thuy M. Bui
*Attorney, Agent, or Firm*—Sherman and Shalloway

[57] ABSTRACT

The present invention is a method and apparatus for providing a sculptured effect to a lawn. Each row of grass can be provided with an aesthetically pleasing cross-sectional configuration utilizing the sculpturing blades of the present invention with a standard rotary lawnmower. The blades include relatively short sections of downwardly offset cutting edges along leading edge of each half of the blade. Various blade design configurations are contemplated and two such designs are disclosed as preferred embodiments. After the blade is mounted for rotation with the output shaft of the internal combustion engine of the lawnmower, the lawnmower is started and throttled down to the greatest extent possible without causing the engine to stall as the lawnmower is pushed across the lawn at a normal to brisk walking pace.

19 Claims, 3 Drawing Sheets

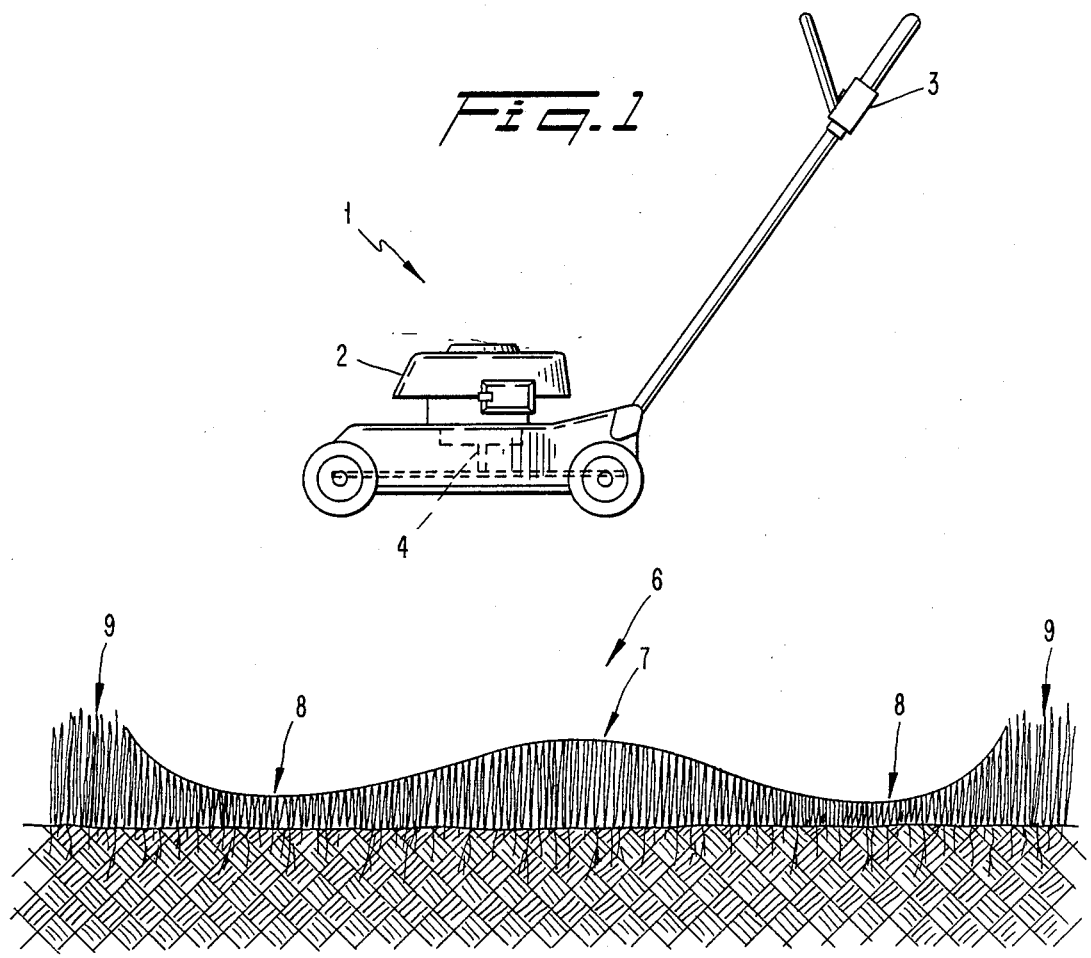
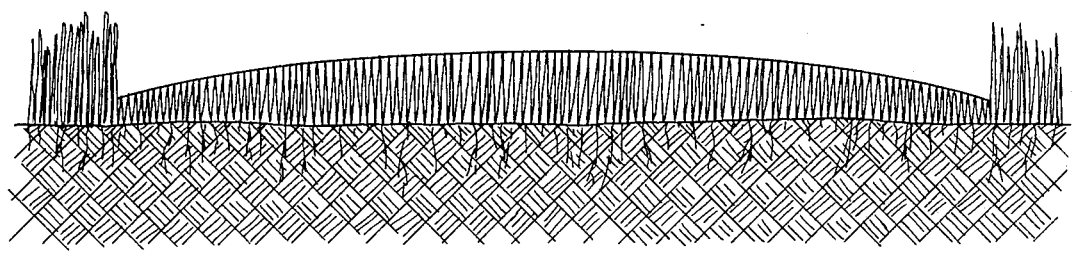

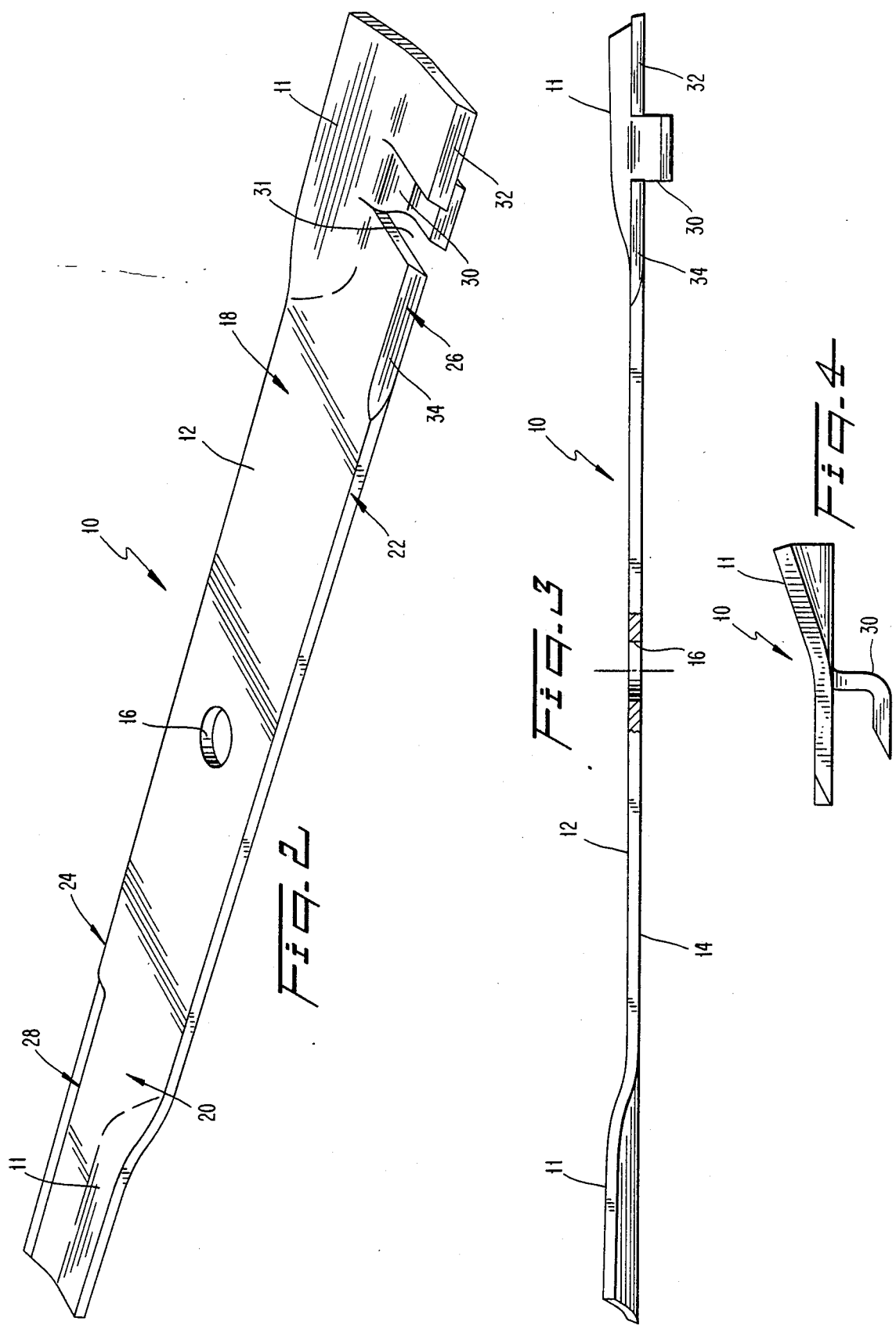

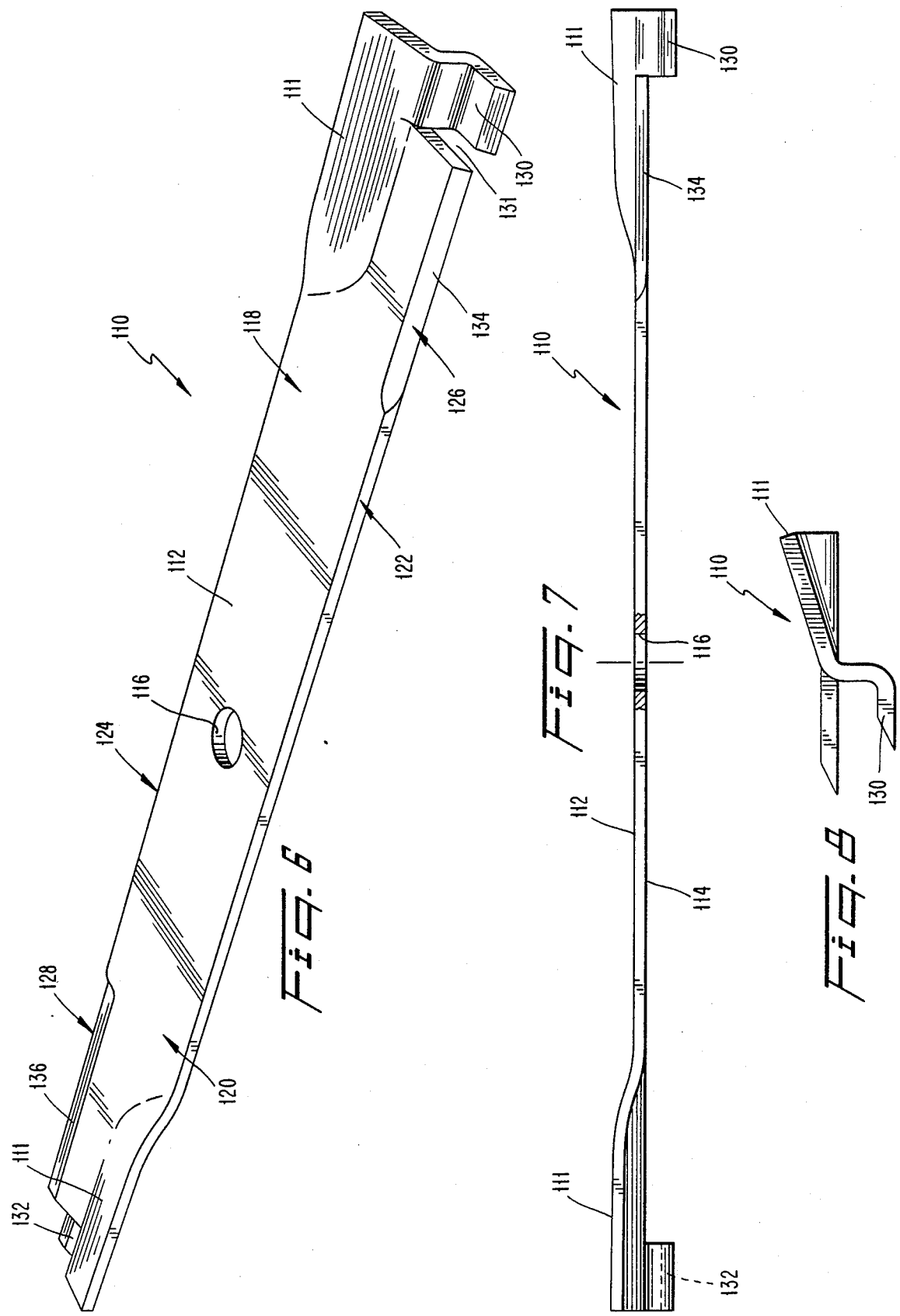

LAWN SCULPTURING METHOD AND APPARATUS

BACKGROUND OF THE INVENTION

1. Field Of The Invention:

The present invention relates generally to a method and apparatus for sculpturing of lawns and, more specifically, to a lawn sculpturing blade for use with a rotary lawn mower and the method of utilizing the sculpturing blade to provide a sculptured effect to a lawn.

2. Description Of The Prior Art:

People have long taken pride in the appearance of their property, and particularly in the appearance of their lawn. This has become increasingly so with the advent of soaring real estate prices. In response, people have begun taking greater and greater interest in the overall appearance and design of their property. One way that people have been improving the aesthetics of their property is through the implementation of intricate landscaping schemes. Large amounts of money are often spent on landscaping as professional landscapers are often required to design and perform the manual labor involved in landscaping.

No matter how pleasingly the landscaping improves the beauty of the property, if the property does not have a well-kept and aesthetically pleasing lawn, it will appear unkempt, and will offset any efforts put into landscaping and other property upkeep.

Since the introduction of rotary lawnmowers driven by internal combustion engines, various improvements have been made in the grass cutting blades utilized. The improvements, however, have been concentrated on the provision of mulching of the grass, improved expulsion of the grass clippings out of the lawnmower and into a collection bag, and ease of replacement of dulled lawnmower blades. However, to the best of applicants knowledge, no blades for use with rotary lawnmowers have been designed specifically for providing sculpturing effect to a lawn.

For example, U.S. Pat. No. 2,908,128 issued to Mauro discloses a lawnmower blade which is designed to provide a twin blade action. That is, it is designed to cut the grass into small clippings so that they are readily dispensed from the lawnmower chamber. This patent does disclose a downwardly offset cutting blade portion (13, 113, 213), but because the downwardly offset cutting edge of this device constitutes a major portion of the cutting edge, it will not provide a sculpturing effect such as provided by the present invention. FIG. 12 of this patent does show that use of the disclosed blade results in a row design wherein outer portions of the grass in each row are cut in a manner that they are higher than the grass portions in the center of the row. However, this will not result in a sculpturing effect in most cases because as the lawnmower is traversed along rows adjacent to the first row, the blade will cut the portion of the grass which had previously been left higher. Furthermore, if the operator of the lawnmower intentionally operates the lawnmower in a manner to avoid cutting of the higher portions of the grass, the grass will appear ragged, and as if the lawn had been mowed in a haphazard fashion.

U.S. Pat. Nos. 2,576,884, 3,243,944, 3,780,509 and 4,254,607 also disclose lawnmower blades with downwardly offset portions of the cutting edge, but each of these blades is so designed for purposes other than sculpturing.

More particularly, U.S. Pat. No. 2,576,884 issued to Leigh discloses a blade which has removable cutting blades attached at both upper and lower portions of the blade. The purpose behind this design is to allow the removable blade to be repositioned when the lower blade dulls, such that the upper and lower blade portions are reversed. The theory behind this design is that the lower blade provides most of the cutting action and is thus worn more quickly.

U.S. Pat. No. 3,243,944 to Michaud discloses downwardly offset blades at the outer end of the cutter blade. These downwardly offset blades are radially adjustable to provide a larger cutting area and are removable for ease of replacement. The design is disclosed as providing enhanced expulsion of clippings, but is not disclosed as being utilized for lawn sculpturing.

U.S. Pat. No. 3,780,509 to Woelffer sets forth a lawnmower blade which is split at each end along a radial line, such that the rearward portions of the blade are offset downwardly. This design does not, however, provide a sculpturing effect. Rather, this particularly blade is utilized to provide twin blade action and expulsion of grass clippings.

The entire cutting portion of the blade disclosed in U.S. Pat. No. 4,254,607 to Moore is offset downwardly. This blade includes a rearwardly and upwardly extending fin (23) which aides in the expulsion of clippings. No sculpturing is provided.

U.S. Pat. No. 4,628,672 to Jones and U.S. Pat. No. 4,715,173 to Anderson each set forth a lawnmower blade which includes upwardly offset cutting edges. Jones' blade is designed so as to provide a slicing of the grass rather than a shearing. Supposedly this design provides a "cleaner" cut and results in longer blade life.

Anderson provides numerous cutting accessories which are disclosed as being for grass cutting, grass mulching and power raking. FIG. 7 of the Anderson Patent shows a blade attachment with an upwardly offset cutting edge. The blade attachment also includes numerous other cutting edges disposed at various heights and lateral locations. These numerous cutting edges each contact the grass blades, and cause repeated cutting of the grass. This repeated cutting acts to provide mulching.

Although various improvements have been made over the years in the design of lawnmower blades for rotary motors, as evidenced in the above described U.S. patents, it does not appear that any lawnmower blade has been heretofore designed for the purpose of providing a sculptured effect to a lawn.

SUMMARY OF THE INVENTION

Accordingly, it is an object of the invention to provide a method and apparatus for use in imparting an aesthetically pleasing appearance to a lawn.

A further object of the present invention is to provide an attachment for rotary lawnmowers which will allow a sculpturing effect to be produced in a lawn as it is cut.

Yet another object of the present invention is to present a method by which to advantageously utilize the specially designed sculpturing lawnmower blade.

The subject invention is embodied as a modified rotary lawnmower blade and as a method for utilizing the modified blade to impart a sculptured effect to a lawn. While various blade designs may be within the scope of the present invention, presently two blade embodiments are preferred. A first of the designs contains the normal 4½ inch cutting surface at one end of the blade and modifies the 4½ inch cutting surface on the opposite end by downwardly offsetting a on inch section of the cutting surface. In particular, the one inch offset portion is centered between the two remaining 1¾ inch cutting surfaces which are located at the original height. The second blade design has 1½ inches of each of the normal three inch cutting surfaces of the blade offset downwardly. The offset portions are located at the distal ends of the blade and the remainder of the "cutting portions" of the blade are blocked (blunted) so they no longer perform a significant cutting function.

In utilizing the blades, they are individually mounted to a standard rotary lawnmower in a conventional manner. The engine is started and the speed of the lawnmower is then throttled down to the minimum speed which can be obtained without stalling the engine during mowing of the lawn at a normal walking pace. The first blade design provides each cut row of grass with a cross-sectional crown shaped, and the second blade design provides each row with a cross-section having a "hump" near the right side of each row.

BRIEF DESCRIPTION OF THE DRAWING FIGURES

The invention will now be described more fully in connection with the accompanying drawing figures in which:

FIG. 1 is an elevation view of a conventional rotary lawnmower with the inventive sculpturing blade being mounted thereon;

FIG. 2 is a perspective view of a first embodiment of the sculpturing blade of the present invention;

FIG. 3 is a front elevation view of the sculpturing blade shown in FIG. 2;

FIG. 4 is a right end elevation view of the sculpturing blade shown in FIGS. 2 and 3;

FIG. 5 shows a transverse cross-sectional view of a row of grass cut with the sculpturing blade shown in FIGS. 2-4;

FIG. 6 is a perspective view of a second embodiment of the inventive sculpturing blade;

FIG. 7 is a front elevation view of the sculpturing blade shown in FIG. 6;

FIG. 8 is a right end elevation view of the sculpturing blade shown in FIGS. 6 and 7; and FIG. 9 shows a transverse cross-sectional view of a row of grass cut with the sculpturing blade shown in FIGS. 6-8.

DETAILED DESCRIPTION OF THE INVENTION

The present invention is embodied as a sculpturing blade for use with a standard rotary lawnmower 1 powered by an internal combustion engine 2 which has a throttle control section 3 and a vertical output shaft 4. In a first preferred embodiment of the present invention, the sculpturing blade 10 comprises a generally planar rectangular elongated steel plate. A mounting hole 16 is centrally mounted in the plate, and provides a means to mount the plate rigidly to the output shaft 4 of the internal combustion engine 2 of the lawnmower 1. Such mounting hole is not an inventive feature of the invention, and is standard for modern rotary lawnmowers blades. Mounting of the blade to the output shaft is generally accomplished by way of a mounting bolt.

Note that although the blade is referred to as being generally planar, it may well include slightly upwardly flared corners 11, 111 between the distal ends and the trailing edges. Such upward flare aids in the expulsion of grass clippings.

The blade includes a top surface 12, which when mounted to the output shaft 4 faces the underside of the lawnmower 1, and a bottom surface 14 which faces downwardly toward the grass. A first half 18 of the sculpturing blade is defined to a first longitudinal side of the mounting hole 16 and a second half 20 of the blade is defined to a second longitudinal side of the mounting hole 16. Each half of the blade includes a leading edge 22, 24 arranged such that when the blade is mounted for rotation with the output shaft 4, each of the leading edges leads its respective half of the blade as the blade is rotated in a clockwise direction. Sharpened cutting edge 26, 28 are defined along outer portions of each of the leading edges 22, 24.

These cutting portions 26, 28 are generally at a normal cutting height and provide a grass cutting function similar to that of any standard blade. On one of the leading edges 22, however, a portion of the cutting edge 26 is downwardly offset from the remainder of the cutting edge. This downwardly offset portion 30 is located between two "normal" height cutting edges 32, 34 and is formed by slits 31 cut in the lateral direction across the blade from the leading edge into a mid-portion thereof. Two such slits 31 are cut into the blade and the portion of the blade defined therebetween is bent downwardly into an L-shaped downwardly offset section 30.

Although, some variation are possible, in this preferred embodiment a downwardly offset portion 30 is defined at only one 22 of the two leading edges 22, 24 of the blade. The length of the cutting edge of the downwardly offset portion 30 is approximately one inch; the "normal" cutting edges 32, 34 having lengths of approximately 1½ inches each. The blade is approximately 18 to 21 inches long and 2¼ inches wide and the downwardly offset portion is offset downwardly by approximately ½ to ⅝ of an inch. These dimensions may be varied in order to produce various sculpturing effects, but it is important to note that any increase in the length of the downwardly offset portion decreases the sculpturing effect provided to each row of the lawn. If the downwardly offset portion is formed as a major portion of the entirety of the cutting edges 26, 28, the sculpturing effect will disappear entirely.

For example, if the downwardly offset cutting portion 30 was provided on both the first 18 and the second half 20 of the blade, the sculpturing effect would be less noticeable because a greater amount of the grass would be cut to the lower height defined by the height of the downwardly offset portions.

The sculpture effect produced by this lawnmower blade 10 is shown generally in FIG. 5. Reference numeral 6 shows a lateral cross-section of a row traversed by a lawnmower utilizing the blade 10. Reference numeral 7 indicates the higher grass portions, and reference numeral 8 indicates the lower grass portions. Uncut portions of the grass bordering the cut row are shown at 9. The exact sculpturing effect produced, however, will depend on various factors such as engine rotation speed and the walking speed of the operator, as well as the design of the blade, as will be discussed below.

A second preferred embodiment of the present invention is shown in FIGS. 6 through 8. This sculpturing blade 110 is also formed of a generally planar elongated rectangular steel plate. A mounting hole 116 is again formed centrally of the blade for use in mounting the blade to the output shaft of the internal combustion engine of the lawnmower 1 by way of a mounting bolt or the like. This sculpturing blade includes a top surface 112, a bottom surface 114, a first blade half 118 extending to a first longitudinal side of the mounting hole 116, and a second blade half 120 extending to a second longitudinal side of the mounting hole 116. First and second leading edges 122, 124 are defined along diametrically opposite portions of the blade such that they lead each respective half of the blade during rotation in a clockwise direction of the blade with the output shaft 4. Along each of the leading edges 122, 124 is defined a cutting edge 126, 128, respectively. Downwardly offset cutting portions 130, 132 are defined along the cutting edges 126, 128 at end portions of each of the first 118 and second 120 halves of the blade. These downwardly offset portions 130, 132 are each defined between a respective distal end of each of the first and second halves of the blade and a slit 131 cut in each blade half from the leading edge 122, 124 laterally across the blade into a mid-portion thereof. The portion of the blade defined between the distal end and the slit 131 is then bent downwardly into an L-shaped section to form the downwardly offset cutting portions 130, 132. In this second preferred embodiment, the normal cutting edges 126, 128 are sharpened only at the downwardly offset cutting edges 130, 132. The remaining portions 134, 136 of each of the normal cutting portions is blunted or dulled such that it does not provide a significant cutting function.

In this preferred embodiment of the present invention, the downwardly offset portions 130, 132 of the cutting edges are each approximately 1½ inches in length. The blunted portions 134, 136 of each of the normal cutting edges 126, 128 are each approximately 1½ inches long. The blade is approximately 18 to 21 inches long and 2¼ inches wide and the downwardly offset portions are offset downwardly by approximately ½ to ⅜ of an inch. A row 5 of the sculptured lawn cut with this sculpturing blade 110 is shown in FIG. 9. The cross-section of the row has a generally crowned effect with lower grass 8 at the portions of the row and higher grass 7 in the center portions. This row is shown as bounded by uncut grass 9.

In order to provide a lawn with a sculptured effect, first a sculpturing blade is chosen which will provide the desired sculpturing effect to the lawn, and it is mounted in a conventional manner to a vertical rotary output shaft 4 of an internal combustion engine 2 of a lawnmower 1. The lawnmower is started in a conventional manner and then throttled down by way of throttle controls 3 to an extent in which the blade is rotating at a speed which is the minimum possible without causing the engine to stall. Thus, it is apparent that the engine speed will have to be varied in dependence on the height of the grass. Once this is accomplished, the lawnmower is moved across the lawn in rows. It is important that the forward speed of the lawnmower be maintained at no less than a normal walking pace, otherwise the blade will rotate upon the same area of grass too many times for a sculptured effect to be accomplished.

A drastic example of this phenomenon will occur if, while running, the mower is maintained at a first position on the lawn, and then incrementally moved forward such that the mower is maintained at each location for a period of time. At the first position, the sculpturing blade will cut the grass in a ringshape. Each time the mower is moved forwardly to the next position, the blade will again cut a ring-shape, but the cut portion of the ring-shape will be located at the previously uncut portion of the last ring-shaped cut. Thus, each incremental forward movement of the rotating sculpturing blade will "erase" the inner-portion of the previous ring-shaped cut. This will also occur, if the lawnmower, while not left in any one position, is moved too slowly across the lawn.

Thus, the sculpturing effect produced will be lessened upon an increase in the overall longitudinal length of the downwardly offset cutting portions, an increase in the rotary speed of the blade, or a decrease in the forward speed at which the lawnmower is moved across the lawn. As is apparent from FIGS. 5 and 9, the cutting edges of the sculpturing blades perform a greater cutting function when the blade is rotated through the portion of its path where it is transverse of the lawnmower, rather than when the blade is rotated through the portion of its path where it is longitudinal with respect to the lawnmower. Such phenomenon results in the above-described sculpturing of the rows of the lawn being mowed.

The inventive sculpturing lawnmower blades, while being useable on various types of mowers has been particularly tested in connection with a 3½ horsepower MASTERCUT lawnmower, model number HT 6522.

Although the present invention has been described particularly with respect to two preferred embodiments, it is contemplated that variations to the preferred embodiments can be made without departing from the scope of the invention as defined by the appended claims. For example, though the sculpturing blade has been described as being usable on rotary lawnmowers that are pushed by an operator, it is also possible that they can be used on rotary lawnmowers which are self-propelled or even on riding lawnmowers.

What is claimed is:

1. A sculpturing attachment for use with a rotary lawnmower for imparting a sculptured effect to a row of grass, comprising:

a rigid elongated lawnmower blade having a top surface, a bottom surface, an aperture formed vertically through said blade at a central longitudinal location of said blade, a first half located to a first longitudinal side of said aperture, a second half located to a second longitudinal side of said aperture, first and second leading edges, said first and second leading edges being those diametrically opposite edges of said blade that lead said first and second halves of said blade, respectively, as said blade rotates clockwise about a vertical axis defined centrally of said aperture; and means, defined on at least one of said first and second leading edges, for cutting a row of grass such that a vertical transverse cross-section of said row is provided with first high portions of grass which are higher than second low portions of grass upon traversing of said blade longitudinally along said row as said blade is rotated, said high portions of grass being bounded at each transverse side of the row by said low portions of grass.

2. A sculpturing attachment as set forth in claim 1, wherein said cutting means comprises a sharpened portion, of at least one of said first and second leading edges, which is downwardly offset from the remainder of said at least one of said first and second leading edges.

3. A sculpturing attachment as set forth in claim 2, wherein said elongated blade further includes first and second trailing edges located at a face of said blade transversely opposite said first and second leading edges, respectively;

said downwardly offset portion being defined by at least one cut extending transverse of said blade from said at least one of said first and second leading edges rearwardly and terminating at a point intermediate said at least one of said first and second leading edges and a corresponding one of said first and second trailing edges: and said downwardly offset portion being further defined by a portion of said blade located longitudinally adjacent said cut being bent downwardly such that the leading edge of said longitudinally adjacent portion is downwardly offset from the remainder of said blade.

4. A sculpturing attachment as set forth in claim 3, wherein said longitudinally adjacent portion comprises an upright L-shaped portion opening toward said at least one of said first and second leading edges.

5. A sculpturing attachment as set forth in claim 3, wherein said at least one downwardly offset portion comprises two downwardly offset portions, one at each of said first and second leading edges.

6. A sculpturing attachment as set forth in claim 5, wherein said elongated blade further comprises first and second blade ends located, respectively, at extreme longitudinally opposite end faces of said blade;

a first of said two downwardly offset portions being located immediately adjacent said first blade end, and a second of said two downwardly offset portions being located immediately adjacent said second blade end.

7. A sculpturing attachment as set forth in claim 6, wherein the leading edge of said remainder of said blade comprises a non-sharpened edge.

8. A sculpturing attachment as set forth in claim 7, wherein said elongated blade is between 18 and 21 inches long; and said leading edge of each of said downwardly offset portions is approximately 1.5 inches long.

9. A sculpturing attachment as set forth in claim 3, wherein said elongated blade further comprises first and second blade ends located, respectively, at extreme longitudinally opposite end faces of said blade; and said at least one downwardly offset portion is located longitudinally inward from one of said first and second blade ends, such that said downwardly offset portion is flanked on each longitudinal side thereof by a blade portion having a leading edge offset upwardly from said leading edge of said downwardly offset portion and at a height equal to the remainder of said leading edge.

10. A sculpturing attachment as set forth in claim 9, wherein said portions of said blade which flank said downwardly offset portion include sharpened leading edges.

11. A method of sculpturing a lawn using a rotary lawnmower having a rotatable vertical output shaft, comprising the steps of:

providing an elongated sculpturing blade having a top surface, a bottom surface, an aperture located centrally of said blade for mounting said blade to said output shaft, a first half of said blade extending longitudinally away from said aperture in a first direction, a second half of said blade extending longitudinally away from said aperture in a second direction opposite said first direction, a first leading edge being defined at a first edge of said first half and a second leading edge being defined at a second edge of said second half, such that said first and second leading edges lead said first and second halves of said blade as said blade rotates clockwise in a horizontal plane, at least one of said first and second leading edges having a sharpened portion thereof downwardly offset from a remainder of said at least one of said first and second leading edges;

fixedly mounting said elongated sculpturing blade to said output shaft such that rotation of said output shaft causes rotation of said elongated blade in said horizontal plane;

starting said internal combustion engine such that said elongated blade is rotated in a horizontal plane;

down-throttling said internal combustion engine as much as possible without causing said engine to stall upon forward movement of said lawnmower across said lawn at a normal walking pace; and moving said lawnmower forwardly in a first row across said lawn at a normal walking pace as said blade is rotating, such that a vertical transverse cross-section of said first row of said lawn attains a profile wherein high portions of lawn are bounded at each transverse side of said row by low portions of lawn.

12. A method of sculpturing a lawn as set forth in claim 11, wherein said lawnmower is moved along a plurality of adjacent rows similar to said first row.

13. A lawn sculpturing blade for use with a rotary lawnmower having a vertical output shaft, comprising:

a rigid elongated substantially planar blade member adapted for mounting on said output shaft for rotation therewith in a horizontal plane;

a first part of said blade member extending from a longitudinal center of said blade member outwardly to a first distal end of said blade member, and a second part of said blade member extending from said longitudinal center of said blade member outwardly to a second distal end of said blade member;

said blade member having a first face along a first longitudinal edge of said first part of said blade member and a second face along a second longitudinal edge of said second part of said blade member;

a first sharpened cutting edge being defined along a portion of said first face near said first distal end and a second sharpened cutting edge being defined along a portion of said second face near said second distal end;

a first portion of said first cutting edge being offset downwardly with respect to the remainder of said first face so as to provide a row of a lawn with a low cut area and a high cut area upon movement of said lawnmower along said row while said blade member is rotating; and said first downwardly offset portion defining a minor longitudinal portion of said first face.

14. A lawn sculpturing blade as set forth in claim 13, wherein
said first downwardly offset portion includes a sharpened cutting edge and is immediately adjacent said first distal end portion.

15. A sculpturing blade as set forth in claim 14, wherein
said sharpened cutting edge of said first downwardly offset portion defines the entirety of said first sharpened cutting edge.

16. A sculpturing blade as set forth in claim 15, wherein
a second downwardly offset portion identical to said first downwardly offset portion is defined along said second face of said blade member.

17. A sculpturing blade as set forth in claim 13, wherein
said first downwardly offset portion is defined along said first sharpened cutting edge between two non-downwardly offset sharpened portions of said first cutting edge.

18. A sculpturing blade as set forth in claim 17, wherein
said first downwardly offset portion is spaced from said non-downwardly offset sharpened portions by transverse slits cut across a portion of said first part of said blade member.

19. A sculpturing blade as set forth in claim 18, wherein
said non-downwardly offset sharpened portions are disposed in a first horizontal plane; and
said second sharpened cutting edge is entirely within said first horizontal plane.

* * * * *